Feb. 25, 1964        H. L. KARIG        3,122,021
STATIC WHEEL BALANCER
Filed July 21, 1961                                        2 Sheets-Sheet 1
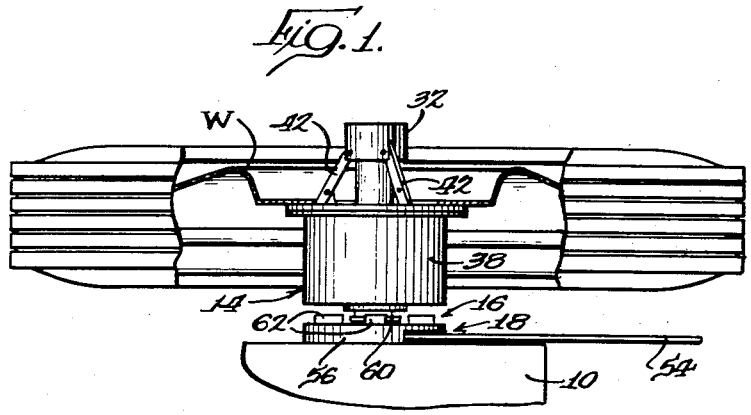
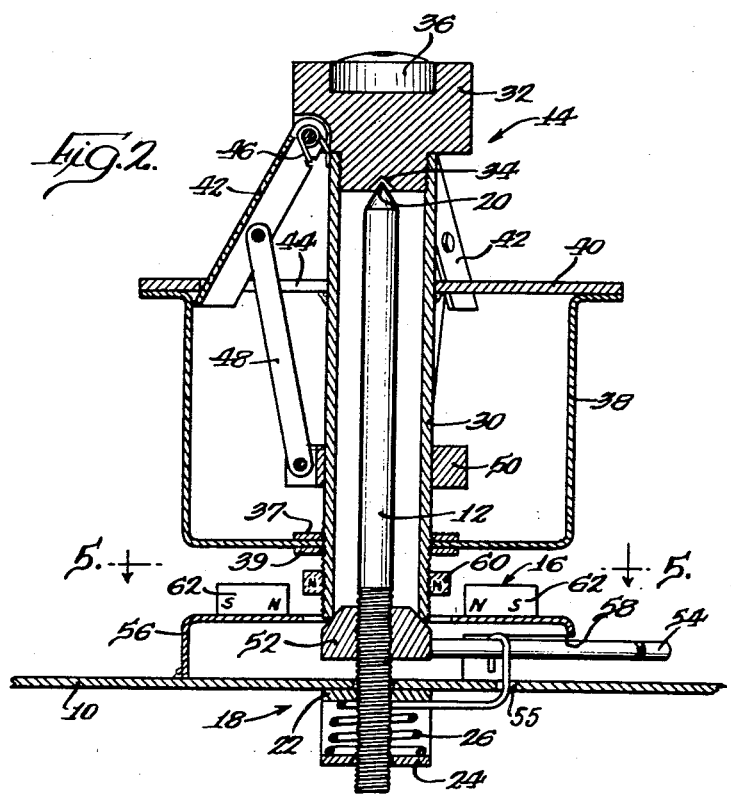
INVENTOR:
Howard L. Karig
BY
Gary, Desmond & Parker
Attys Feb. 25, 1964   H. L. KARIG   3,122,021
STATIC WHEEL-BALANCER
Filed July 21, 1961   2 Sheets-Sheet 2
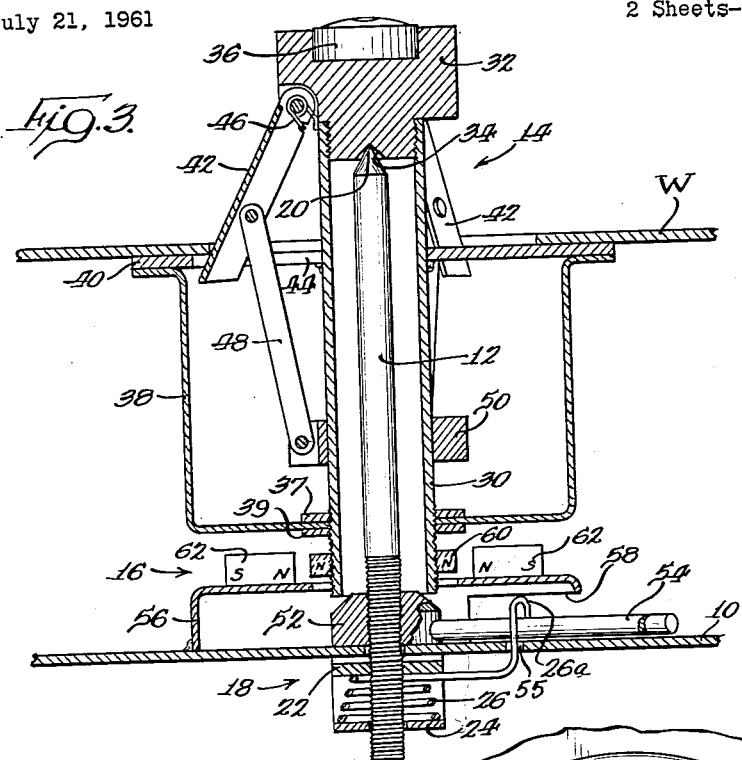
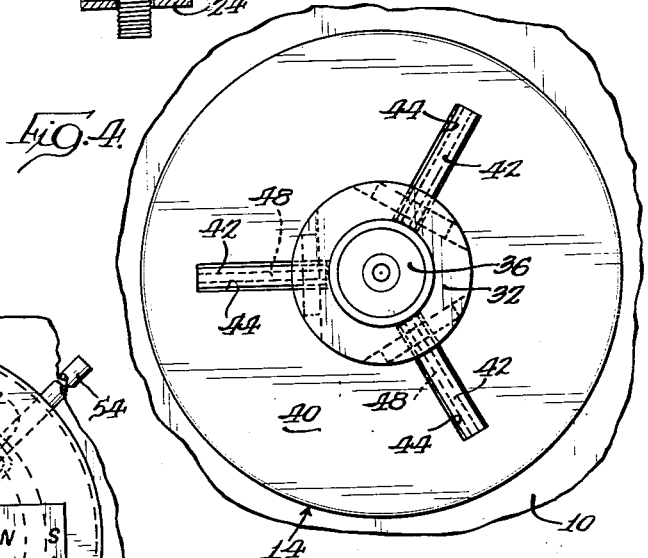
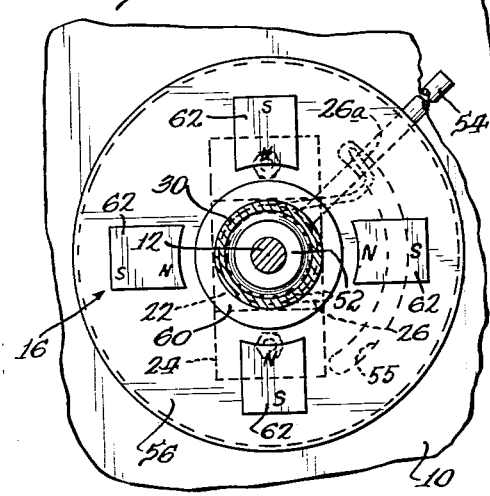
INVENTOR.
Howard L. Karig
BY
Gary, Desmond & Parker
Attys

United States Patent Office 3,122,021
Patented Feb. 25, 1964

3,122,021
STATIC WHEEL BALANCER
Howard L. Karig, 134 Fellows Court, Elmhurst, Ill.
Filed July 21, 1961, Ser. No. 125,771
7 Claims. (Cl. 73—485)

The present invention relates to balance indicating apparatus for automobile wheels, and particularly, to an improved static balancer of economical construction comprising a precision device facilitating extreme accuracy of wheel balancing and incorporating means assuring its precision despite abusive service and lack of maintenance.

The object of the invention, stated broadly, is to provide significant improvements in the type of balancer comprising a vertical fulcrum post, a wheel supporting assembly tiltably supported on a fulcrum point or ball defined on the upper end of the post, means on the assembly for supporting the wheel in a generally horizontal position, and means for centering the wheel relative to the fulcrum.

In the first instance, it is an object of the invention to provide an improved wheel support comprising a horizontal plate having a fixed vertical position spaced below the fulcrum engaging surface of the support and means for centering the wheel on the plate comprising a plurality of circumferentially spaced spring biased radially collapsible fingers of wear-resistant material eliminating the disadvantages of the vertically reciprocable centering cone employed in the prior art, and also in conjunction with the support plate, eliminating the disadvantages of prior art finger-type support means.

Another object of the invention is to provide improved means for damping oscillation of the wheel support assembly to speed up the balancing operation; said means including a balance tube comprising or having permanent magnet means defining a radially outwardly facing pole of given polarity at the lower end of the tube, and permanent magnet means circumscribing the lower end of said tube and having its pole of said given polarity facing said tube.

A further object of the invention is the provision of means for automatically protecting the entire balancer and particularly the fulcrum surfaces or point from damage; said means comprising a cam or nut for separating the support assembly from the fulcrum point of the post when the balancer is not in active use and during placement of wheels on and removal of wheels from the balancer, means normally biasing the cam or nut in the direction to separate the wheel support from the fulcrum, and a constructional arrangement of these components whereby said biasing means is rendered ineffective when the full weight of a wheel is on the balancer but is automatically rendered effective as soon as the weight is relieved.

These and other objects and advantages of the invention will become more clearly apparent in the following detailed description.

Now, in order to acquaint those skilled in the art with the manner of making and using my improved static wheel balancer, I shall describe, in connection with the accompanying drawings, a preferred embodiment of my balancer and the preferred manner of making and using the same.

In the drawings:

FIGURE 1 is a side view of the balancer of my invention with a vehicle wheel thereon, portions of the wheel being broken away to reveal the balancer;

FIGURE 2 is a vertical section, on an enlarged scale, of the balancer showing the same in its normal at rest condition with no wheel thereon;

FIGURE 3 is a vertical section of the balancer showing the same in balancing position;

FIGURE 4 is a plan view of the balancer; and

FIGURE 5 is a horizontal section taken substantially on line 5—5 of FIGURE 2 and showing the damping means in plan.

As shown particularly in FIGURES 2 and 3, my balancer comprises a base 10, a vertical fulcrum post 12 projecting upwardly from the base, a wheel support assembly 14 mounted on the post, damping means 16 for the assembly 14, and a fulcrum safety assembly 18.

The base 10 may take any suitable form desired or conventional in the art, its only requirements being sufficient rigidity and strength to afford a stable support for the remainder of the apparatus and a vehicle wheel, and capability for reciprocable mounting of the post 12.

The post 12 may also be generally conventional, a suitable and preferred embodiment comprising a rigid solid cylindrical shaft having a conical portion precision ground at its upper end to define an upwardly extending pivot or fulcrum point 20. According to the present invention, the shaft or post is reciprocably mounted adjacent its lower end on the base 10. In the illustrated embodiment this is accomplished by slidably extending a threaded lower end portion of the post through a hole in the base 10, threading the post through a retaining nut 22 and extending the post through an alined opening in a nut-restraining bracket 24 secured to the base. The bracket is generally U-shaped, is welded or otherwise secured to the base, and embraces the sides of the nut 22 to prevent rotation and limit vertical movement of the same. A spring 26 is confined between the nut and the bracket about the post 12 for normally biasing the nut and the post upwardly, as shown in FIGURE 2.

The support assembly 14 comprises an elongate balance tube 30 of a length less than that of the post adapted to encircle the post and including a head 32 in its upper end adapted to rest on the post. The head is provided with a downwardly facing conical recess 34 coaxial with the tube defining a seat adapted to rest on the fulcrum point 20. The seat 34 is formed to have clearance relative to the conical upper end of the post and the inner diameter of the tube 30 is substantially greater than the outer diameter of the post, whereby the tube and its head are adapted for tiltable movement relative to the post about the fulcrum point 20. The head 32 also comprises a vial cup for reception in the upwardly facing surface portion thereof coaxially of the tube of a conventional spherical leveling vial 36 for indicating the position of the tube relative to vertical.

An enlarged cylindrical supporting cup or shell 38 is secured at its lower end to the lower end of the tube 30 concentrically therewith, the shell extending upwardly and mounting at its upper end a concentric wheel supporting plate 40 which projects radially outwardly from the tube at right angles thereto at a level below the fulcrum seat 34. To accommodate adjustment of balancer sensitivity, I prefer to adjustably mount the shell 38 and plate 40 on the tube by means of a pair of nuts 37 and 39 threaded onto the tube 30 and disposed to opposite sides of the base of the shell. In use, the wheel, indicated at W, is placed with its center hole over the upper end of the tube and is lowered thereover, whereby the central portion of the wheel will rest on the plate 40, as best shown in FIGURE 1.

To center the wheel coaxially with the tube as it is being lowered onto the assembly 14, I provide a plurality of circumferentially spaced radially collapsible centering arms or fingers 42. Preferably, each finger is of L, T or channel shape in cross-section, is pivotally mounted adjacent its upper end in a respective one of corresponding downwardly facing recesses in the head 42 and extends downwardly from the head into the plate 40. The plate is provided with respective radial slots 44 for reception of the fingers 42 with freedom for radial movement of the lower end portions of the fingers. Each finger is normally biased to the outer end of the respective slot, as by torsion spring 46 surrounding the pivot pin of the respective finger. While the fingers could be independent, I prefer to couple the same for conjoint movement by connecting each finger via an intermediate link 48 to a collar 50 reciprocably mounted on the tube 30, whereby the fingers are constrained to move together. Consequently, as a wheel is lowered onto the support 14, the fingers 42 engage the margin of the center hole of the wheel and cause the wheel to assume a position coaxial with the tube 30. To this end, I provide at least three of the fingers 42 disposed at equal circumferential spacings. The fingers are preferably formed of a wear-resistant metal thereby to have a long service life. The springs 46 are relatively strong, but yield in the presence of a wheel so that the wheel may collapse the fingers equally and to the extent necessary for the wheel to assume a horizontal position flush on the plate 40.

The disclosed centering fingers afford several advantages over the vertically reciprocable centering cones heretofore employed in the art. The fingers 42 provide multiple contact points with the center hole of the wheel thereby to afford greater accuracy in centering in the event that the margin of the hole is burred or out-of-round. Burrs on the wheel must contact some portion of any centering cone, whereas the multiple contacts afforded by my centering fingers can readily be placed to either side of the burrs. Also, it is to be noted that my centering fingers are secured against relative rotation so that the same will not rotate when a wheel is revolved on the plate 40 to insure centering of the same with uniform contact. The centering cones heretofore employed in the art are usually rotatably mounted on the balance tube, and it is therefore difficult to hold the same stationary while revolving a wheel, with the result that absolute uniformity of engagement of the wheel with the cone has been difficult to achieve. Also, most cones have been subject to rapid wear from repeated contact with the sharp edges of the margins of the center holes and wheels because they are conventionally manufactured from soft metals such as aluminum, cast iron and steel stampings. The multiple contact fingers provided by the present invention, since they are of small size, can readily and economically be fabricated of hardened tool steel to resist wear throughout a long service life. The cone-type of centering means further permit dirt and grit to collect between the cone and the side wall of the support cup and between the cone and the balance tube, thereby causing rapid wear of the components and consequent loss of accuracy in balancing. The present invention facilitates ease of cleaning, but more particularly my balancer is so constructed that any dirt or grit falling through the slots or into the interior of my device falls into non-critical areas that can cause no damage to working parts. Specifically, the pivot pins for the fingers 42 are shielded in the downwardly opening slots in the head 32, thereby to insure accurate mounting of the arms throughout a long service life. Any dirt falling through the slots 44 will simply fall on the links 48 and the collar 50, which are non-critical parts of the apparatus and do not require extreme accuracy of fit or contact with one another or the tube 30. In general, the centering fingers of the present invention facilitate substantial economies of both tooling and manufacture, and result in a maintenance-free centering means of extremely long service life to provide an accurate and durable product at minimal cost. But at the same time, the fingers 42 facilitate resting of the wheel on the vertically adjustable plate 40 to afford maximum sensitivity to unbalance and to insure consistent response of the assembly 14 and the leveling vial 36 to a given degree of unbalance, so that balancing will be expedited for any operator experienced with the unit.

To afford optimum protection for the critical components of the device, especially the fulcrum point 20 and the fulcrum seat 34, I provide safety means, indicated generally at 18, which in essence comprises cam means operatively associated with the base 10, the post 12 and the tube 30 to cause relative reciprocation of the post and the tube selectively in opposite directions thereby to engage the fulcrum seat with the fulcrum point and tiltably mount the assembly 14 on the post when the device is in use, and to separate the fulcrum seat from the fulcrum point when the device is not in use and during placement of wheels on and removal of wheels from the device. In its preferred embodiment, the means 18 includes the reciprocable post 12, the elements 22, 24 and 26 which reciprocably mount the post 12 on the base 10, and a nut or cam 52 threaded on the lower end portion of the post between the base and the lower end of the tube 30. This nut has a lower surface complemental to the adjacent surface of the base 10 and a frusto-conical upper portion of a size to engage in the lower end of the tube 30 and to center the tube relative thereto. A radially extending handle 54 is provided on the nut 52 to facilitate manipulation thereof when a wheel is in place on the assembly 14, and torsion spring means is associated with this handle normally to bias the handle and the nut in a given direction to a given position. Preferably, the spring 26 comprises a combined compression and torsion spring, the same normally biasing the nut 22 upwardly and including a radially and upwardly extending end portion 26a engaging the handle 54 and biasing the same in a counter-clockwise direction, as viewed in FIGURE 5. To accommodate passage of the spring end 26a, the base 10 is provided with an arcuate slot 55. Suitably, the nut 52, the spring end 26a, and the slot 55 are covered by an inverted shallow dish-shaped casing 56 secured to the base 12 and having a slot 58 in its side wall accommodating passage of and defining stop means for the handle 54.

The nut 22 on the post 12 has a relatively firm or tight engagement therewith whereby the nut, being restrained against rotation by the bracket 24, restrains the post against rotation. However, the nut 12 does accommodate adjustment of the post relative to the nuts 22 and 52 and the base 10, thereby to facilitate variation in the elevation of the fulcrum point 20 to insure optimum operation of the device. The nut 52 is relatively loosely threaded on the post and therefore is rotatable relative to the post for the purposes below-described.

In the normal at-rest condition of my balancing device, as shown in FIGURES 2, 4 and 5, the spring 26 raises the post 12 upward to the extent accommodated by the nut 22 and biases the handle 54 to the counter-clockwise stopped position defined by the slot 58 in the enclosure or casing 56. This latter function of the spring causes the nut 52 to assume a relatively elevated position on the post 12 wherein it engages in the lower end of the tube at such elevation as to cause the seat 34 to be raised off the fulcrum point 20, as shown in FIGURE 2. Consequently, the assembly 14 is centered and supported on the nut 52 so that any blows inadvertently imparted to the balancer will not result in damage to the fulcrum point and seat. Should a blow cause the assembly 14 to tilt relative to the nut 52, the side wall of the seat defining recess will simply abut against the side wall of the point defining conical portion of the shaft without damage to the point or seat, yet without moving the point and seat out of cooperative relation.

When a wheel is to be placed on the balancer, the center hole of the wheel is alined over the head 32 of the assembly 14 and the wheel is lowered onto the assembly. The margin of the center hole contacts the centering fingers 42, whereby the fingers center the wheel coaxially of the tube 30, and the wheel is brought to rest on the plate 40. As the wheel is being lowered onto the assembly 14 and its weight is released by the mechanic, the spring 26 in its function as a compression spring absorbs and cushions the shock to protect the entire unit from damage. At this time, the seat 34 is still spaced from the point 20, so that the same are fully protected from damage. As the spring 26 compresses, the nut 52 is brought into flush frictional engagement with the base 10, whereby it is restrained against rotation. Consequently, the mechanic may revolve the wheel on the assembly 14 to assure centering thereof while the entire assembly including the fingers is frictionally held against rotation. If need be, the mechanic can grasp the head 32 to insure against relative rotation of the assembly 14.

With the wheel fully supported and centered on the assembly 14, the balancer is conditioned to determine the balance of the wheel simply by swinging the handle 54 in the clockwise direction, as viewed in FIGURE 5, to the opposite end of the slot 58. Due to the length of the handle, the frictional resistance of the nut 52 to rotation is readily overcome. Rotation of the handle and nut causes the nut to assume a relatively lower position on the post 12, and since the nut is already rested on the base 10, the result is raising of the post upwardly to gently engage its point with the seat 34 and to raise the tube 30 off the nut 52, whereupon the assembly 14 and the wheel W become tiltably supported on the point 20. Any unbalance of the wheel will cause it to tilt to a position inclined to horizontal with its heavy side down, which position will be clearly and accurately indicated by the leveling vial 36. Balancing of the wheel may then be effected in conventional manner.

Should the nut 52 in a given embodiment have insufficient vertical movement relative to the post 12 and tube 30 to accommodate full swinging or tilting movement of the wheel support assembly 14 when the assembly is fulcrumed on the point 20, a small diameter nut may be substituted for the nut 52 and a supplemental vertically movable lift tube (not shown) may be extended between this nut and the head 32 in telescoping relation to the post 12. The mode of operation and results of this arrnagement would of course be the same as that herein attributed to the nut 52.

As the tube 30 is raised off the nut 52 and the wheel commences to tilt due to unbalance, the tendency toward pendulous oscillation of the assembly and the wheel will be mitigated due to the relatively low speed of separation of the tube from the conical portion of the nut 52. Further to damp any tendency toward oscillation, I provide the damping means 16. According to my invention, the damping means is magnetic, in the form preferably of permanent magnets, and includes a balance tube 30 having a given magnetic polarity at its lower end and permanent magnet means circumscribing the lower end of the tube and having its pole of said given polarity juxtaposed to the lower end of the tube. In the preferred embodiment, the magnetic arrangement includes an annular permanent magnet 60 secured to the lower end of the tube, the magnet being polarized in the radial direction whereby one pole of given polarity faces radially outwardly of the tube. The tube circumscribing magnet means may take the form of a complementary concentric annular permanent magnet, or may comprise magnet segments or a plurality of individual magnets 62, also polarized in the radial direction but having its or their poles of said given polarity facing radially inwardly toward the magnet 60 whereby to repel the same. By employing annular magnets and/or at least three and preferably four permanent magnets 62 of equal strength and equal circumferential spacing about the tube, the magnets 62 exert equal repelling forces on the tube and thereby quickly damp any oscillatory movement of the assembly 14 and the wheel. By utilizing the repelling forces of the magnets, I prevent occurrence of adherence of the tube magnet 60 to a stationary magnet 62 as might occur if the attractive forces of the magnets were employed. Preferably, the magnets 62 are secured to the upper surface of the casing 56. The magnets, like the remainder of the device, afford the particular advantage that they require no maintenance.

When the mechanic grasps the wheel to remove the same from the balancer (to secure balance weights thereto or after checking the balanced wheel), and he relieves the balancer of the weight of the wheel, the compression force of the spring 26 raises the post 12 and thereby the nut 52 to free the latter from the base 10. As soon as the frictional resistance to rotation is removed from the nut, the torsional force of the spring 26 returns the handle 54 to its initial position at the end of the slot 58, whereby the nut is threaded upwardly on the post 12 to engage the tube 30 and raise the seat 34 off the point 20, whereby the seat and point are protected from damage during subsequent removal of the wheel from the balancer. Thus, the fulcrum point and seat are automatically separated from one another at all times except when the balancer is in actual use to determine the balance of a wheel.

By virtue of the above described construction, I have provided a balancer requiring essentially no maintenance since the only critical parts, i.e., the fulcrum point and seat and the pivots of the arms 42, are protected and/or shielded from damage, and since the remaining components do not require maintenance or service. Yet, I provide a balancer that is economically and easily produced, that is lightweight, that provides for extreme ease of use, that is not reliant on personnel for enjoyment of its protective features, and that assures consistent response of the balancer to wheel unbalance by virtue of accurate centering of the wheel on a support plate having a fixed location with respect to the fulcrum point about which wheel balance is determined. Consequently, all of the objects and advantages of the invention have been shown herein to be attained in a convenient, economical and practical manner.

While I have shown and described what I regard to be a preferred embodiment of my invention, it will be appreciated that various changes, rearrangements and modifications may be made therein without departing from the scope of the invention, as defined by the appended claims.

I claim:

1. In a static wheel balancer having a vertical fulcrum post and a balance tube encircling the post and tiltably mountable thereon, the improvement comprising a horizontal wheel supporting plate fixed on said tube below its upper end and having a plurality of circumferentially spaced radial slots therein, said plate being of a diameter for reception thereon of the central portion of a wheel, a plurality of centering fingers pivotally mounted on said tube adjacent its upper end and extending downwardly into respective ones of said slots, and means biasing the lower end portions of said fingers outwardly in said slots, said fingers being engageable in the center hole of the wheel and being radially contractible at their lower ends to center the wheel on said plate.

2. In a static wheel balancer having a vertical fulcrum post and a balance tube encircling the post and tiltably mountable thereon, the improvement comprising a horizontal wheel supporting plate adjustably secured on said tube below its upper end and having a plurality of circumferentially spaced radial slots therein, said plate being of a diameter for reception thereon of the central portion of a wheel, a plurality of centering fingers pivotally mounted on said tube adjacent its upper end and extending downwardly into respective ones of said slots, a collar slidably mounted on said tube below said plate, links coupled to said fingers and said collar for causing conjoint movement of said fingers, and means biasing the lower end portions of said fingers radially outwardly in said slots, said fingers being engageable in the center hole of the wheel and being radially contractible at their lower ends to center the wheel on said plate.

3. In a static wheel balancer having a base, a vertical fulcrum post projecting from the base and a balance tube encircling the post and tiltably mountable thereon, the improvement comprising means mounting the post for vertical reciprocation, post reciprocating means between the base and the tube engageable with and disengageable from the tube and the base, said reciprocating means upon engagement with the base and upon movement thereof in one direction raising the post and disengaging from the tube to cause the tube to be supported on the post and upon movement in the other direction lowering the post and engaging the tube to cause separation of the post and the tube, and means normally biasing the post upwardly and said post reciprocating means in said other direction normally to separate the post and the tube, the weight of a wheel on said tube depressing the post and engaging said post reciprocating means with the base, said biasing means being rendered ineffective by the weight of the wheel and the consequent engagement of the reciprocating means with the base while the wheel is on the tube.

4. In a static wheel balancer having a base, a vertical fulcrum post projecting from the base and a balance tube encircling the post and tiltably mountable thereon, the improvement comprising means mounting the post for vertical reciprocation, a nut threaded on said post between the base and the tube operatively engageable with the tube to cause separation of the post and the tube, and means normally biasing the post upwardly and said nut in a direction to separate the post and the tube, the weight of a wheel on said tube depressing the post and frictionally engaging said nut with the base, the nut being rotatable to engage the post with the tube and operatively separate the tube from the nut to accommodate balancing of the wheel, said biasing means upon removal of the wheel raising said post and disengaging said nut from the base and thereafter rotating the nut to effect relative movement of the post and the tube, operatively engage the nut with the tube and separate the tube from the post.

5. In a static wheel balancer having a base, a vertical fulcrum post projecting from the base and a balance tube encircling the post and tiltably mountable thereon, the improvement comprising means mounting the post for vertical reciprocation, a first nut retained against rotation on the base and threaded on the post to accommodate adjustment of the elevation of the post relative to the base and to normally retain the post against rotation, a second nut threaded on said post between the base and the tube operatively engageable with the tube to cause separation of the post and the tube, and means normally biasing the post upwardly and said second nut in a direction to separate the post and the tube, the weight of a wheel on said tube depressing the post and frictionally engaging said second nut with the base, the second nut being rotatable to engage the post with the tube and operatively separate the tube from the second nut to accommodate balancing of the wheel, said biasing means upon removal of the wheel raising said post and disengaging said second nut from the base and thereafter rotating said second nut to effect relative movement of the post and the tube, operatively engage the second nut with the tube and separate the tube from the post.

6. In a static wheel balancer having a base, a vertical fulcrum post projecting from the base and a balance tube encircling the post and tiltably mounted thereon, the improvement comprising a horizontal wheel support fixed on said tube below its upper end and having a plurality of circumferentially spaced radial slots therein, a plurality of centering fingers pivotally mounted on said tube adjacent its upper end and extending downwardly into respective ones of said slots, means biasing the lower end portions of said fingers radially outwardly in said slots, means mounting the post for vertical reciprocation, post reciprocating means on the post between the base and the tube engageable with and disengageable from the tube and the base, said reciprocating means upon engagement with the base and upon movement thereof in one direction raising the post and disengaging from the tube to cause the tube to be supported on the post and upon movement in the other direction lowering the post and engaging the tube to cause separation of the post and the tube, and means normally biasing the post upwardly and said post reciprocating means in said other direction normally to separate the post and the tube, a wheel placed over said tube being centered relative thereto by said fingers, being rested on said support, depressing the post and engaging said post reciprocating means with the base, said biasing means being rendered ineffective by the weight of the wheel and the consequent engagement of the reciprocating means with the base while the wheel is on the tube.

7. A static balancer for vehicle wheels comprising a base, an upwardly extending fulcrum post reciprocably mounted on said base, a balance tube encircling said post and having a seat adjacent its upper end for tiltable engagement with the upper end of the post, a wheel support on said tube spaced below said seat, a plurality of circumferentially spaced centering fingers pivotally mounted on said tube adjacent its upper end and extending downwardly into said support, said support having radial slots therein for receiving and accommodating movement of the lower end portions of said fingers, means biasing the lower ends of said fingers radially outward, means including a collar slidably mounted on said tube and links extending between the collar and the fingers for causing said fingers to move conjointly, said tube comprising permanent magnet means defining an outwardly facing pole of given polarity at its lower end, magnet means on said base circumscribing the lower end of said tube and having its pole of said given polarity facing said tube, the lower end of said post having a screw thread thereon, a first nut restrained against rotation on the base and threaded on said post to accommodate adjustment of the elevation of the post relative to the base and to normally retain the post against rotation, a second nut threaded on said post between said base and the lower end of said tube, a handle on said second nut for rotating the same on the post, said second nut being operatively engageable with and disengageable from said tube upon upward and downward threaded movement of the same relative to the post for separating the post and tube upon relative upward threaded movement of said second nut and for causing the tube to rest on the post upon relative downward threaded movement of said second nut, and combined compression and torsion spring means between said post and said base having one end engaged with the base and the other end engaged with said handle, said spring means normally biasing said post upwardly and biasing said handle in the direction to cause separation of the post and the tube.

References Cited in the file of this patent
UNITED STATES PATENTS

| | | |
|---|---|---|
| 2,502,633 | Shepard | Apr. 4, 1950 |
| 2,688,456 | Jensen | Sept. 7, 1954 |
| 2,879,667 | Henderson | Mar. 31, 1959 |
| 2,909,063 | Bageman | Oct. 20, 1959 |